United States Patent

[11] 3,628,092

[72] Inventor August I. Keto
 Sharon, Pa.
[21] Appl. No. 94,846
[22] Filed Dec. 3, 1970
[45] Patented Dec. 14, 1971
[73] Assignee Westinghouse Electric Corporation
 Pittsburgh, Pa.

[54] ELECTRICAL INDUCTIVE APPARATUS WITH
 REMOVABLE PROTECTIVE FUSE
 10 Claims, 3 Drawing Figs.

[52] U.S. Cl. .................................................... 317/15,
 337/186, 337/202, 337/207
[51] Int. Cl. .................................................... H02h 7/04,
 H02h 85/18, H01h 85/60
[50] Field of Search ........................................... 317/15;
 337/186, 202, 204, 207, 228

[56] References Cited
 UNITED STATES PATENTS
3,365,616 1/1968 Hermann ..................... 317/15
3,475,693 10/1969 Ristuccia ..................... 337/207
3,480,898 11/1969 Giegerich ..................... 337/186 X Primary Examiner—A. D. Pellinen
Attorneys—A. T. Stratton, F. E. Browder and Donald R. Lackey ABSTRACT: Electrical inductive apparatus, such as a transformer, having a casing containing an electrical winding immersed in a liquid dielectric, and a protective fuse assembly connected between a bushing mounted on the casing and the electrical winding. The protective fuse assembly includes a receptacle which extends into the casing and into the liquid dielectric, but it is sealed therefrom, and a removable fused portion accessible from outside the casing. The receptacle is formed of a plurality of metallic and insulating tubular members, with the ends of certain of the insulating tubular members extending into the ends of a metallic tubular member, to provide sealed, electrically shielded joints. The fused portion includes a current limiting fuse having electrodes connectable via associated contact members to stationary contacts within the receptacle. Arc extinguishing members carried by both the receptacle and fused portions cooperate to make the assembly and disassembly of the fused portion and receptacle load-make and load-break.

INVENTOR
August I. Keto

Patented Dec. 14, 1971

ELECTRICAL INDUCTIVE APPARATUS WITH REMOVABLE PROTECTIVE FUSE

BACKGROUND OF THE INVENTION

1. Field of the Invention

The invention relates in general to electrical inductive apparatus, such as distribution transformers, and more specifically to protected electrical inductive apparatus having a current limiting fuse.

2. Description of the Prior Art

Many developments have occurred in recent years which have improved electrical service to the user. For example, the impedance of electrical distribution transformers has been reduced to 2 percent, or less, which improves voltage regulation and reduces lamp flicker, particularly on overloads, and the feeder lines have been made "stiffer," electrically, to provide and maintain the high-quality electrical service that the user now expects. These developments, however, have resulted in a great increase in the magnitude of the power available at a fault. The prior art protective link or fuse which is connected in series with the high-voltage winding, and which has an interrupting capacity of about 3,500 to 5,000 amperes, thus is unable to clear a low-impedance fault which may result in current magnitudes in the range of 10,000 to 25,000 amperes.

Prior art arrangements for interrupting these higher fault currents have included connecting a current limiting fuse in series with the prior art protective link, or in providing a single, full-range current limiting fuse. Some of these arrangements vent the tank when the fuse is removed, resulting in the spurting of transformer oil from the fuse assembly when the transformer seal is broken, and the early fuse arrangements were nonload-break, requiring the addition of a costly auxiliary load-break switch in series with the fuse.

Fusing and switching functions have been combined into a single assembly, such as disclosed in U.S. Pat. No. 3,471,816. However, while these prior art combination fuse holder and switching devices have been successful functionally, they are relatively costly to manufacture due to the complicated contact arrangements employed, and due to the care required in providing joints between metallic and insulating portions of the apparatus which are free of trapped air, which air may ionize and produce corona discharges under the influence of the high electrical potentials present in the fuse holder.

Thus, it would be desirable to provide new and improved protected electrical inductive apparatus, having a protective fuse device with load-break capability, but which is constructed in a manner which is not only less costly to manufacture due to its improved structural arrangement, but which arrangement also substantially reduces the voltage gradient at the joints between metallic and insulating portions of the fuse apparatus, making the assembly and manufacture of the fuse apparatus less critical and therefore, less costly.

SUMMARY OF THE INVENTION

Briefly, the present invention is new and improved protected electrical inductive apparatus, such as a distribution-type transformer, especially distribution transformers of the type suitable for pad, or vault mounting. The inductive apparatus includes a casing containing a high-voltage winding immersed in a liquid dielectric, such as mineral oil. Protective fuse apparatus containing a full-range current limiting fuse, capable of interrupting 25,000 amperes symmetrical at 8,300 volts to ground is connected between a high-voltage bushing mounted on the basing and the high-voltage winding of the apparatus. The protective fuse apparatus includes a tubular receptacle which is sealingly mounted through an opening in the casing, with the only opening to the longitudinal cavity or chamber of the receptacle being accessible from outside the casing. The receptacle, which includes first and second spaced stationary contacts, is formed of a plurality of metallic and insulating tubular members, with the first stationary contact of the receptacle being formed by the inner surface of a metallic tubular member. The insulating tubular members connected to this metallic tubular member extend into the ends thereof, to provide joints which are electrically shielded by the outer surface of the metallic tubular member.

The protective fuse apparatus also includes a removable portion which includes the current limiting fuse, and first and second contacts connected to the electrodes of the current limiting fuse which electrically engage the first and second stationary contacts of the receptacle when the fused portion is assembled therewith. First and second arc extinguishing members, carried by the receptacle and fused portions, respectively, are located to confine and extinguish an arc formed between the second contacts of the receptacle and fused portion.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
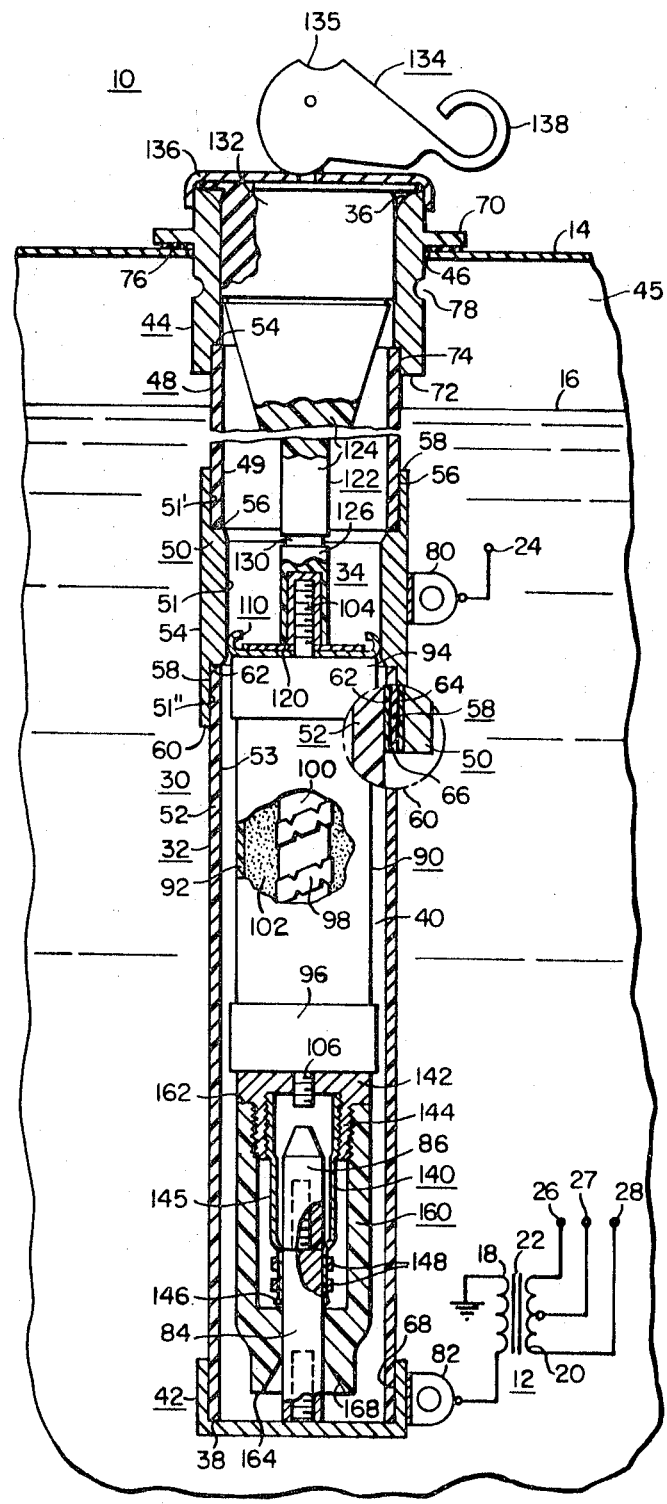
FIG. 1 is a fragmentary, elevational view, partially in section and partially schematic, of protected electrical inductive apparatus constructed according to the teachings of the invention, and having protective fuse apparatus especially suitable for inductive apparatus of the type mounted below grade.

Referring now to the drawings, and FIG. 1 in particular, there is shown a fragmentary, elevational view, partially in section and partially schematic, of protected electrical inductive apparatus 10, such as a transformer of the distribution type, constructed according to an embodiment of the invention. Inductive apparatus 10 includes a magnetic core-winding assembly 12, shown schematically, disposed in a tank or casing 14, which is filled to a predetermined level 16 with liquid dielectric means, such as mineral oil.

The magnetic core-winding assembly 12 is immersed in the liquid dielectric, and includes high- and low-voltage windings 18 and 20, respectively, disposed in inductive relation with a magnetic core 22. One end of the high-voltage winding 18 is connected, via protective fuse apparatus 30, to the encased end of a high-voltage bushing, represented by terminal 24, and the other end may be grounded, as shown, or connected to another high-voltage bushing via another protective fuse assembly, as required by the application. The weather end of the high-voltage bushing is adapted for connection to an alternating electrical potential. The low-voltage winding 20 is connected to the encased end of low-voltage bushings, represented by terminals 26, 27 and 28, and the weather ends of the low-voltage bushings are adapted for connection to a load circuit.

The protective fuse apparatus 30, which in this embodiment is especially suitable for submersible inductive apparatus to be mounted partially or wholly below grade, includes a substantially tubular receptacle 32, and a removable fused portion 34. The receptacle 32 has first and second ends 36 and 38, respectively, a longitudinal opening, cavity or chamber 40, which extends between its ends, a metallic cap member 42 formed of a good electrically conductive material, such as copper or aluminum, disposed to seal the second end 38 of the receptacle, and mounting means 44 for sealingly mounting the receptacle 32 through an opening 46 in the casing 14. Opening 46 may be located in the cover of the casing of an electrical distribution transformer, and, as illustrated, the receptacle 32 extends through the gas space 45 above the level 16 of the liquid dielectric, and then into the liquid dielectric. However, while the receptacle extends into the liquid dielectric or mineral oil, it is important to note that the protective apparatus 30 is not of the oil circuit breaker type, as the opening 40 in the receptacle 30 is hermetically sealed from the inside of the tank or casing, with the only access to opening 40 being through end 36 from outside the casing 14.

The receptacle 32 is formed of a plurality of partially telescoped tubular members, and in addition to the metallic cap member 42, and mounting means 44, includes first, second, and third axially aligned tubular members 48, 50 and 52, respectively, which provide first, second and third inner surfaces 49, 51 and 53, respectively. The first tubular member 48 has first and second ends 54 and 56, respectively, the second tubular member 50 has first and second ends 58 and 60, and the third tubular member has first and second ends 62 and 38, respectively. The second end 38 of the third tubular member 52 provides the second end of the receptacle 32.

The first and third tubular members 48 and 52 are formed of an oil-resistant electrical insulating material, such as a glass-filled epoxy or polyester resin system, and if the voltage class the protective apparatus is designed to operate with is above about 7,200 volts, the resin may be filled with finely divided alumina trihydrate, to obtain arc and track resistance.

The second tubular member is formed of a good electrical conductor, such as copper or aluminum, having a smooth, curved outer surface 54, and a larger inside diameter adjacent each of its first and second ends 58 and 60, than the inside diameter of the central portion which defines the major inner surface 51. The larger inner diameters adjacent to ends 58 and 60 of the metallic tubular member 50 provide inner surfaces 51' and 51", respectively, and these diameters are dimensioned to receive the ends 56 and 62 of the first and third insulating tubular members 48 and 52, respectively, with a predetermined small clearance between the outer surface of the first tubular member 48 and surface 51', and between the outer surface of the third tubular member 52 and surface 51". The diameter of surface 51 of the second metallic tubular member 50 is selected to be slightly less than the inner diameter of the first tubular member 48. This allows a contact member to make sliding contact with the surface 51, without contacting the inner wall of the first tubular member 48.

The joints 56 and 58 formed between the second tubular member 50 and the first and third tubular members 48 and 52, respectively, are critical, in that they must provide hermetic seals, without ionization of any air trapped therein, and the seals must be maintained during thermal cycling of the inductive apparatus 10, which changes the dimensions of the joined metallic and insulating tubular members at different rates of expansion and contraction. The potential gradient in the joints 56 and 58 is reduced by the disclosed joint construction, providing a high corona inception level, wherein the joints 56 and 58 are shielded by the outer surface 54 of the metallic tubular member 50, providing a smooth, curved metallic surface about each joint which reduces the potential gradient therein. This joint construction thus facilitates the assembly and manufacture of the protective fuse apparatus 30, as the joint construction is not as critical, nor are the tolerances of the tubular members which form the joints.

The different coefficients of thermal expansion of the metallic tubular member 50 and the insulating tubular members 48 and 52, are accommodated without loss of hermetic seal during thermal cycling, by a combination of thermoplastic and thermosetting resins applied to the joints. More specifically, the portion of the joint 58 enclosed in circle 60 is shown greatly enlarged, in order to more clearly illustrate a preferred joint construction. The surfaces to be joined, i.e., the outer surface of tubular member 52, adjacent its end 62, and the inner surface 51" of tubular member 50, are coated with a thermoplastic resin which adheres tenaciously to the specific metal and insulating materials used, with a thermoplastic resin of the saturated, linear polyester type being excellent for glass-filled epoxy or polyester tubes, and also for copper or aluminum tubes. The thermoplastic coatings on tubular members 52 and 50 are indicated by reference numerals 62 and 64, respectively. Then, before the tubular member 52 is telescoped into the end of tubular member 50, a coating 66 of a thermosettable resin is applied to either of the two surfaces to be joined, or to both, and the end 62 of tubular member 52 is advanced into end 60 of tubular member 50, until end 62 rests against the step formed between the surfaces 51" and 51 of the tubular member 50. The thermosettable resin may then be cured to an infusible solid. The thermosettable resin selected should adhere tenaciously to the thermoplastic coating selected, with a thermosettable resin of the epoxy type being excellent when the thermoplastic resin is of the polyester type.

All of the other joints between metallic and insulating tubular members may be formed in a similar manner, such as the joint 56 between tubular members 48 and tubular member 50, the joint between tubular member 48 and mounting means 44, and the joint between tubular member 52 and the metallic cap 42. The metallic cap 42 is a substantially tubular member, having one closed end, and an opening sized to receive the second end 38 of the third tubular member 52, providing a joint 68 which is shielded by the outer surface of the metallic cap 42, and which is sealed in the same manner as hereinbefore described relative to joint 58.

The mounting means 44 is a substantially tubular metallic member, which may be formed of brass, steel, or stainless steel, as required, having a flange 70 which extends outwardly from its outer surface, and first and second ends 36 and 72, respectively. The first end 36 is also the first end of the receptacle 32. There will be little electrical stress adjacent the juncture of tubular member 48 and mounting means 44, so it is not essential that the metallic portion of the joint therebetween be external to the insulating portion. However, for purposes of example, the insulating tubular member 48 is shown extending into the end 72 of the mounting means 44, providing a joint 74 which may be sealed as hereinbefore described relative to joint 58.

Flange 70 may be welded to the casing 14, or, as illustrated, a gasket member 76 may be disposed between the flange 70 and the casing 14, and suitable hardware (not shown) may be disposed inside the casing, about the mounting means 44, to firmly hold the flange 70 against the gasket member 76 and tank 14. For example, a conventional garter spring and clamping ring or flange arrangement may be used, with the garter spring being disposed in a circumferential groove 78 located between the ends 36 and 72 of the mounting means; or, the external surface of the mounting means 34 may be threaded for receiving a spring-type locknut.

At least the second and third tubular members 50 and 52 are wholly immersed in the liquid dielectric, to provide additional electrical insulating strength about the metallic tubular member 50, and the metallic cap member 42, and first and second metallic terminals 80 and 82 are electrically and mechanically joined to the external surfaces of the metallic tubular member 50 and metallic cap member 42, respectively, which terminals are also disposed below the level 16 of the liquid dielectric. Terminal 80 is connected to the high-voltage bushing, represented by terminal 24, and terminal 82 is connected to the high-voltage winding 18; or terminal 80 may be connected to winding 18 and terminal 82 to the high-voltage bushing, as desired.

Spaced terminals 80 and 82 provide the external electrical contact points for the receptacle 32. First and second internal electrical contacts for connection to the fused portion 34 of the protective fuse apparatus 30, which are electrically connected to the first and second external contact points, respectively, are provided by the internal surface 51 of the second tubular member 50, and by a contact member 84 which is electrically connected to the internal surface of the metallic cap member 42. The preferred construction for contact 84 is in the form of an upstanding probe, as illustrated, as this construction facilitates the inspection, cleaning and maintenance for both the receptacle 32 and the removable fused portion 34. However, a tubular-type pressure contact member may be connected to the metallic cap member 42, and a cooperative probe contact may be connected to the removable fused portion as illustrated in the embodiment of the invention shown in FIG. 3.

An insulating rod member 86 is fixed to the upwardly extending end of the probelike contact 84, and it has an outside diameter which is substantially the same as the outside diameter of the probe contact 84. Insulating rod member 86 is formed of an arc extinguishing material, and as will be hereinafter described, it cooperates with an insulating member formed of an arc extinguishing material carried by the removable fused portion 34, to extinguish an arc formed between the probe contact 84 and its complementary contact carried by the removable fused portion 34. Thus, insulating rod member 86 is part of a combination which provides the protective fuse apparatus 30 with load-break capability, eliminating the need for an auxiliary load-break switch. Load-break capability, as used in this specification, also signifies load-make and fault close-in capabilities.

There are many different insulating materials which possess arc extinguishing characteristics, as opposed to arc tracking characteristics, with the arc extinguishing materials producing gases when being subjected to the heat of an arc, which gases expand to blast, cool and deionize the arc. Further, the byproducts of a good arc extinguishing material will not track or create a path for electrical current to flow. For example, the arc extinguishing members may be formed of a high molecular weight polyoxylmethylene, as described in U.S. Pat. No. 3,059,081, which is assigned to the same assignee as the present application; or, preferably, the arc extinguishing members may be formed of a material which includes methyl methacrylate polymer filled with glass fibers, which is disclosed in copending application Ser. No. 1,827, filed Jan. 9, 1970, which application is assigned to the same assignee as the present application. Arc extinguishing members formed of glass-filled methyl methacrylate interrupt and extinguish an arc without excessive gas formation, and without providing excessive amounts of conductive particles, such as free carbon, which makes its used in closed-type interrupters particularly attractive.

The removable fused portion 34 includes a fuse 90, which is a fuse of the full-range, nonvented current limiting type. Fuses of the current limiting type are disclosed in U.S. Pat. Nos. 2,496,704, 2,502,992 and 3,134,874, for example, all of which are assigned to the same assignee as the present application. Current limiting fuse 90 includes an insulating fuse tube 92, formed of a suitable material, such as glass melamine, first and second metallic ferrules or electrodes 94 and 96, respectively, which may be pressed over and secured to the fuse tube 92 by a suitable adhesive, or otherwise fixed to opposite ends of the fuse tube. A fusible element 98 is disposed through the opening in the fuse tube 92, and connected between the first and second electrodes 94 and 96, with the fusible element being supported on an insulating support member 100, if desired. The fusible element 98, which is usually formed of a flat ribbon of silver, has a plurality of spaced notches which extend inwardly from the sides thereof, to periodically reduce the width of the strip and provide a series of arcs during the operation thereof, such that the sum of the plurality of arc voltages provides the current limiting effect desired. Arc extinction without requiring venting of the fuse is obtained by filling the fuse tube 92 with a pulverulent or granular arc quenching material 102, such as silica sand, and the insulating support member 100 may be formed of an arc quenching material, such as a glass polyester including a suitable filler, such as alumina trihydrate, for antitracking characteristics. The first and second electrodes have means connected thereto, such as axially extending threaded stud members 104 and 106, respectively, for connecting contact members thereto. The full-range current limiting fuse provides protection for the feeder system against faults in the inductive apparatus, with the current limiting fuse extinguishing the arc at the designed let-through current, and it also protects the transformer against short circuits and long-time overloads in the connected load circuit. It also protects operating personnel, as the current limiting fuse may be safely connected into a circuit having a low-impedance fault, as the current limiting fuse clears the circuit without exploding or otherwise initiating hazardous operating conditions.

Figures 2, 3:
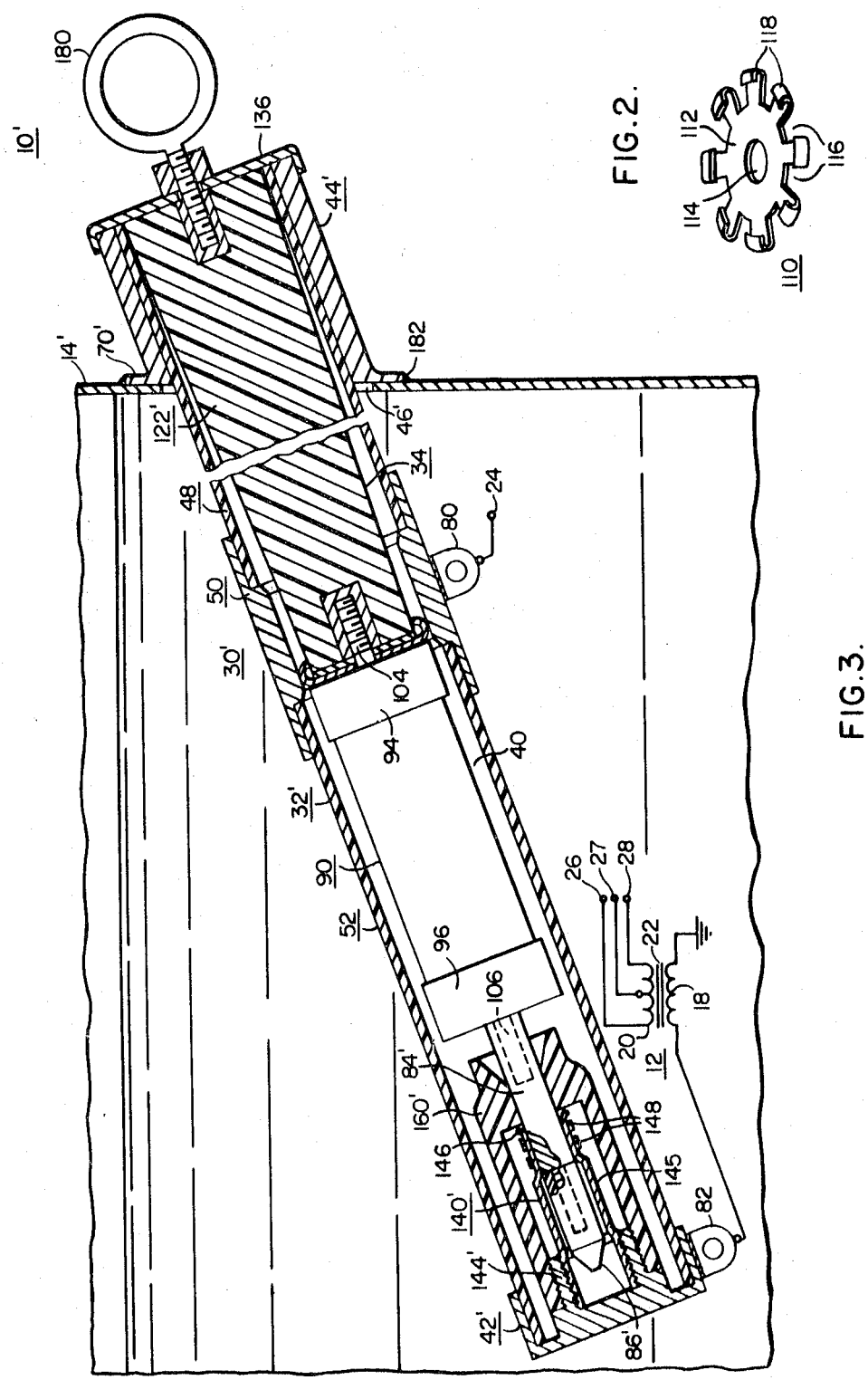
FIG. 2 is a perspective view of one of the electrical contact members of the protective fuse apparatus shown in FIG. 1.
FIG. 3 is a fragmentary, elevational view, partially in section and partially schematic, of protected electrical inductive apparatus constructed according to another embodiment of the invention, having protective fuse apparatus especially suitable for pad mounted inductive apparatus.

The first electrode 94 includes a first contact member 110 fixed thereto, which is illustrated in a perspective view in FIG. 2. Contact member 110 is adapted to make sliding electrical contact with the inner surface 51 of the second tubular member 50 of the receptacle 32. Contact member 110 is formed of a good electrical conductor having spring characteristics, such as beryllium-copper, or spring bronze. Contact member 110 is formed from a flat plate 112 of the selected material, and it has a central opening 114 and a plurality of spaced peripheral indentations 116 which provide a plurality of outwardly extending fingers 118. The ends of fingers 118 are curved, with the unflexed maximum diameter of the resulting contact structure being slightly larger than the diameter of surface 51. Contact member 110 is placed over the stud 104 of the electrode 94, with the stud 104 extending through opening 114 of the contact member, and a flat metallic washer member 120 is placed over the stud 104, against the flat portion of the contact member 110.

The stud member 104 is then threadably engaged with the end of an operating handle 122, with the end of the operating handle 122 firmly pressing the washer member 120 and contact 110 against the end of the electrode 94.

Operating handle 122 includes an insulating shaft member 124, which may be formed of a resin, such as an epoxy resin system, and it may include first and second mechanically connected portions 124 and 126, which are interconnected by a ball-and-socket universal-type joint 130. The universal joint facilitates insertion of the fuse 90 into the receptacle 32, when the inductive apparatus 10 is mounted partially or wholly below grade level.

Since protective fuse apparatus 30, in this embodiment, is for inductive apparatus of the submersible type, which may be mounted in vaults and flooded with water, operating handle 122 includes means for sealing the opening 40 adjacent to the first end 36 of the receptacle. The sealing means may be in the form of an expandible stopper or seal 132 formed of a resilient material, such as rubber, with the expansion of the seal being responsive to the movement of a cam-type operating mechanism 134. A metallic cap 136 is disposed over the expandible seal 132, to protect the expandable seal from damage. Cam mechanism 134 includes a ring member 138, which enables the removable fused portion 34 to be inserted into the receptacle 32, and cam operated, as well as to break the seal and withdraw the removable fused portion 34, when desired, by using a hook stick.

Electrode 96 of fuse 90 includes the second contact member of the fuse 90, which is a tubular-type pressure terminal or contact 140. Contact 140 may include a first metallic portion 142 which is threadably secured to the stud member 106, and which has an outwardly extending tubular portion 144 threaded on both its inside and outside diameters. The contact 140 is completed by a tubular second portion 145, which has threads on its outside diameter adjacent to one end thereof, which end is threadably engaged with the internal threads of portion 144, and with the other end of portion 145 being longitudinally slotted to provide a plurality of outwardly extending fingers 146, which provide a pressure-type terminal having an inside diameter sized to provide pressure engagement with the probe contact 84. Spring member 148 are disposed about the fingers 146, to maintain the desired inside diameter of the opening in the pressure terminal portion 145 of the contact 140, and provide and maintain a good electrical contact between the fingers 146 and the probe contact 84 when assembled therewith.

A tubular insulating member 160 is carried by the fused portion 34, which cooperates with the insulating probe 86 to extinguish arcs formed between the lower contacts of the receptacle 32 and fused portion 34. Insulating member 160 has first and second ends 162 and 164, respectively, a threaded opening adjacent to its first end sized to enable the insulating member 160 to be threadably engaged with the threads on the outside diameter of portion 144 of contact 140, and an opening adjacent to its second end sized to provide a close sliding fit with the probe contact 84 and the insulating snuffer rod or probe 86. The opening adjacent to end 164 is preferably larger immediately at end 164, narrowing with a taper 168 to the required smaller diameter, in order to facilitate alignment of the removable fused portion 34 upon its insertion into receptacle 32. Insulating member 160 is formed of arc extinguishing material, such as hereinbefore described, relative to insulating member 86.

The longitudinal dimensions of the inner surface 51 of the second tubular member 50 of the receptacle 32, is selected such that the first contact 110 of the fused portion 34 makes contact with surface 51 prior to the engagement of the lower contacts 84 and 140, and conversely such that upon removal of the fused portion 34, contacts 84 and 140 will disengage prior to contact 110 leaving the inner surface 51 of the metallic tubular member 50. This arrangement ensures that the load-make and break functions occur at the lower contact assembly, where the arc extinguishing members are disposed to extinguish the arc.

In the operation of the protective fuse apparatus 30, when it is desired to connect the high voltage winding 18 to the high voltage bushing, the fused portion 34, having current limiting fuse 90 attached thereto, is inserted into receptacle 32. Contact 110 first engages the inner surface 51 of the tubular member 50, and then contacts 140 and 84 engage, to connect the fuse between the bushing terminal 24 and the high voltage winding 18. Cam mechanism 134 is then actuated to seal the opening. A bail clip or spring (not shown) may be connected over depression 135 in the cam mechanism 134, to secure the fused portion in the receptacle 32. Arcing is directed to occur between contacts 140 and 84, and the arc is quickly extinguished by the adjacent arc extinguishing members 86 and 160. If the apparatus 10 is to be disconnected from the source of alternating potential while under load, the cam mechanism 134 is actuated to release the seal, and the removable fused portion 34 may then be pulled from the receptacle with a hook stick. Arcing occurs between contacts 140 and 84, but it is confined, squeezed and quickly extinguished by the cooperatively positioned arc extinguishing members 160 and 86. It will be noted that arc extinguishing member 160 is shaped to provide a hood which encloses the arc and retains any arc generated particulate material. The inside of the receptacle thus remains clean and free of such particles.

If the fuse 90 blows due to a fault in the inductive apparatus 10, or due to a fault in the load, or due to a sustained overload in the load circuit, the fuse 90 operates without contaminating the inside of the casing 14, since opening 40 is sealed from the casing 14. Further, there is no pressure buildup in the receptacle 32, as the current limiting fuse is nonventing, operating to clear the circuit on faults up to 25,000 amperes symmetrical at 8.3 kv. to ground. When the seal to the receptacle is released prior to replacing the fuse, oil does not spurt from the receptacle, as the inside of the receptacle is sealed from the oil-filled casing. When the fuse 90 is replaced and reinserted into the receptacle, there is no hazard to operating personnel, even in the event the fuse blows immediately due to a low impedance fault in the transformer. The fuse will clear the fault, without explosion, and it will indicate to the operating personnel that there is a fault in the transformer, or in the connected load.

When the protective fuse apparatus 30 is to be used with pad mounted type inductive apparatus, instead of apparatus of the submersible type, its construction may be simplified by eliminating the seal 132 on the operating handle, and also the universal joint 130. Electrical inductive apparatus 10' of this type is shown in FIG. 3, in an elevational view, which is partially in section and partially schematic. Like reference numerals in FIG. 1 and 3 indicate like components, and like reference numerals except for a prime mark indicate modified components of the apparatus. Also, the load-break contact arrangement at the bottom of the protective fuse assembly 30' is shown reversed in FIG. 3, compared with its orientation in FIG. 1.

More specifically, protective fuse apparatus 30' includes an operating handle 122' which is of one-piece construction, instead of the two-piece construction shown in FIG. 1, eliminating the universal joint, and the expandable seal and cam operating mechanism are also eliminated. The operating handle may retain the top cap member 136, in order to provide a dust seal for the receptacle, and it may include a ring-type handle 180 which enables operation of the protective fuse apparatus 30' with a hook stick.

In inductive apparatus of the pad mounted type, the protective fuse apparatus 30' may be disposed through a sidewall of the casing 14', with its longitudinal axis being either horizontal, or at a predetermined angle from the horizontal, as illustrated. Since a seal is not required, at the top of the receptacle, the first insulating tubular member 48 may extend completely through the mounting means 44', if desired, or it may be constructed as shown in FIG. 1. The mounting means 44' may be constructed with a flange 70', which is welded to the casing 14', such as illustrated at 182, or it may have any other suitable arrangement for making a sealed connection through an opening in the casing 14'.

The metallic cap member 42 may be modified to include a tubular extension 144' which has threads on its internal and external diameters, with the tubular extension extending coaxially into the opening 40 of the receptacle 32', which extension forms a part of the contact member 140'. The remaining portion of contact member 140' includes a tubular member 145 which is similar to the member 145 shown in FIG. 1, having a threaded end which is threadably engaged with the internal threads of the portion 144', and with its other end being slotted to provide a plurality of pressure-type fingers 146. A probe type contact 84' is connected to the stud member 106 of the fuse 90, and the snuffer rod 86' is connected to the outwardly extending end of the probe contacts 84'. The operation of the protective fuse apparatus 30' is as hereinbefore described relative to the operation of the protective fuse apparatus shown in FIG. 1.

In summary, there has been disclosed a new and improved electrical inductive apparatus having protective fuse apparatus which provides short circuit and over-load protection, as well as load-make, load-break, and fault close-in capability, without resorting to serially connecting a plurality of fuses, or connecting a fuse with an auxiliary load-break switch, Further, the transformer tank is not contaminated nor is it vented by the protective fuse apparatus, nor does oil spurt from the receptacle of the protective fuse apparatus when the fuse is removed therefrom. The protective fuse apparatus disclosed, facilitates the manufacture thereof, and reduces its manufacturing cost, by assembling the receptacle from a plurality of metallic and insulating tubular members, with the disclosed joint construction providing a very high corona inception voltage level, as well as accommodating the different coefficients of thermal expansion of the metallic and insulating tubular members, without destroying hermetic seals at the joints between the members. A preferred arrangement for the load-break contacts and arc extinguishing members permits easy inspection of both the contacts of the receptacle and of the removable fuse portion, and the disclosed quench hood construction of one of the arc extinguishing members traps arc generated particulate material, permitting many more operations than prior art apparatus, as it prevents the arcing byproducts from collecting on highly stressed portions of the apparatus.

I claim as my invention:

1. Electrical inductive apparatus, comprising:

a casing having electrical bushings, and an opening, liquid dielectric means disposed in said casing, electrical winding means disposed in said casing and immersed in said liquid dielectric means, protective fuse apparatus, including a tubular receptacle and a removable fused portion, said receptacle having first and second ends, an opening extending between its ends, and a metallic cap member disposed to seal the opening at the second end of the receptacle, means sealingly mounting the receptacle through the opening in said casing, with the first end of the receptacle being accessible outside said casing, and with its second end extending into said casing, said receptacle including first, second and third axially aligned tubular members, providing first, second and third inner surfaces, respectively, with at least the second and third tubular members being immersed in said liquid dielectric means, said second tubular member being metallic, having a substantially smooth, curved outer surface, said first and second tubular members being formed of electrical insulating materials, said first and third tubular members extending for predetermined dimensions into opposite ends of said second tubular member, providing first and second joints between said second tubular member and said first and third members, respectively, which are shielded by the outer surface of said second tubular member, means sealing said first and second joints, preventing entry of said liquid dielectric means into the opening of said receptacle, said removable fuse portion including fuse means having first and second electrodes, handle means for removably inserting said fuse means into the first end of the opening in said receptacle, and first and second contact members connected to said first and second electrodes, respectively, said first and second contact members being adapted to make sliding contact with the inner surface of said second tubular member, and to engage the contact member connected to said metallic cap member, respectively, when said removable fuse portion is in assembled relation with said receptacle, first and second arc extinguishing members carried by said receptacle and removable fused portion, respectively, which are disposed to confine and extinguish an arc formed between the second contacts of said removable fused portion and the contacts of said metallic cap member, first and second terminals connected to said second tubular member and to said metallic cap member, respectively, and means electrically connecting said first and second terminals between said winding means and a bushing on said casing.

2. The electrical inductive apparatus of claim 1 wherein the handle means on the removable fused portion includes means for sealing the opening at the first end of the receptacle, when the removable portion is in assembled relation with the receptacle.

3. The electrical inductive apparatus of claim 1 wherein the fuse means is a fuse of the current limiting type.

4. The electrical inductive apparatus of claim 1 wherein the means sealing the first and second joint includes coatings of thermoplastic resin on the adjacent surfaces of the joints, separated and bonded together by a layer of thermoset resin.

5. The electrical inductive apparatus of claim 4 wherein the thermoplastic resin is a saturated, linear polyester, and the thermoset resin is an epoxy.

6. The electrical inductive apparatus of claim 1 wherein the handle means on the removable fused portion includes a universal joint, to facilitate insertion of the fuse portion into the first end of the receptacle.

7. The electrical inductive apparatus of claim 1 wherein the means for sealingly mounting said receptacle through the opening in said casing includes a fourth tubular member formed of metal, with an end of the first tubular member sealingly extending into the opening of said fourth tubular member.

8. The electrical inductive apparatus of claim 1 wherein the metallic cap member is an tubular member having closed and open ends, with the second end of a receptacle sealingly extending into the open end of the metallic cap member.

9. The electrical inductive apparatus of claim 1 wherein the contact member connected to the metallic cap member is a probe-type contact which extends axially outward from the metallic cap member into the opening of a receptacle, and the first arc extinguishing member is also probe shaped and fixed to the outwardly extending end of said probe-type contact member.

10. The electrical inductive apparatus of claim 1 wherein the first contact member of the fused portion is a substantially flat circular plate having a plurality of spaced peripheral indentations which provide a plurality of outwardly extending fingers, the ends of which are bent to provide resilient contacts suitable for engaging the inner wall surface of the second tubular metallic member.

* * * * *

UNITED STATES PATENT OFFICE
CERTIFICATE OF CORRECTION

Patent No. 3,628,092      Dated December 14, 1971

Inventor(s) August I. Keto

It is certified that error appears in the above-identified patent and that said Letters Patent are hereby corrected as shown below:

Column 9, line 22, the word "second" should be -- third --.

Column 10, line 32, the article "an" should be -- a --.

Signed and sealed this 14th day of May 1974.

(SEAL)
Attest:

EDWARD M. FLETCHER, JR.
Attesting Officer

C. MARSHALL DANN
Commissioner of Patents